(12) United States Patent
Yu et al.

(10) Patent No.: US 6,473,006 B1
(45) Date of Patent: Oct. 29, 2002

(54) METHOD AND APPARATUS FOR ZOOMED DISPLAY OF CHARACTERS ENTERED FROM A TELEPHONE KEYPAD

(75) Inventors: Francis S. Yu, Redwood Shores; Alain S. Rossmann, Palo Alto, both of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/447,927

(22) Filed: Nov. 23, 1999

Related U.S. Application Data

(63) Continuation-in-part of application No. 09/332,436, filed on Jun. 14, 1999, which is a continuation of application No. 08/570,384, filed on Dec. 11, 1995, now Pat. No. 5,911,485.

(51) Int. Cl.$^7$ .............................................. H03K 17/94
(52) U.S. Cl. ........................... 341/23; 341/22; 345/467; 345/471
(58) Field of Search .................... 341/22, 23; 345/467, 345/470, 471, 128, 130, 141; 379/88.14

(56) References Cited

U.S. PATENT DOCUMENTS

| | | | |
|---|---|---|---|
| 4,427,848 A | | 1/1984 | Tsakanika ................. 379/93.27 |
| 4,677,659 A | | 6/1987 | Dargar ..................... 379/93.27 |
| 4,737,980 A | * | 4/1988 | Curtin et al. ................. 379/93 |
| 4,866,759 A | | 9/1989 | Riskin ..................... 379/93.27 |
| 5,031,206 A | | 7/1991 | Riskin ..................... 379/93.27 |
| 5,128,672 A | | 7/1992 | Kaehler ....................... 341/23 |
| 5,200,988 A | | 4/1993 | Riskin ..................... 379/93.27 |
| 5,561,710 A | | 10/1996 | Helms ..................... 379/93.27 |
| 5,625,375 A | * | 4/1997 | Keen .......................... 345/128 |
| 5,797,098 A | * | 8/1998 | Schroeder et al. .......... 455/464 |
| 5,911,485 A | | 6/1999 | Rossmann ................... 341/22 |
| 5,963,671 A | * | 10/1999 | Comerford et al. ......... 345/168 |
| 6,157,323 A | * | 12/2000 | Tso et al. ..................... 341/22 |

* cited by examiner

*Primary Examiner*—Timothy Edwards, Jr.
(74) *Attorney, Agent, or Firm*—Beyer Weaver & Thomas LLP

(57) ABSTRACT

A method and apparatus to provide users with enhanced visual feedback after entry of data. When a user activates a key or inputs a sequence of keystrokes, a corresponding data character or characters is determined and displayed in a highlighting window. The desired character or set of characters may be determined by a predictive data entry method. The highlighting window provides greater visual feedback to the user through magnification, reverse video, or some other form of contrast enhancement method. If the user scrolls to a new character or characters because the currently displayed one(s) are not desired, then the new character or characters are displayed in the highlighting window. When the user ceases scrolling, indicating that the currently displayed character or characters are what the user desires, the highlighting window disappears and the display of the selected character or characters is restored to be the same format as previously entered characters.

20 Claims, 5 Drawing Sheets

METHOD AND APPARATUS FOR ZOOMED DISPLAY OF CHARACTERS ENTERED FROM A TELEPHONE KEYPAD

CROSS-REFERENCE TO RELATED APPLICATION

This application is a continuation-in-part of pending U.S. patent application Ser. No. 09/332,436, filed Jun. 14, 1999. Which is a continuation of Ser. No. 08/570,384, now U.S. Pat. No. 5,911,485, entitled "A Predictive Data Entry Method For A Keypad", filed on Dec. 11, 1995, by Alain S. Rossmann, one of the co-inventors hereof.

BACKGROUND OF THE INVENTION

1. Field of the Invention

The present invention relates generally to the display of information on small display screens, and in particular, to a method and apparatus for displaying and highlighting data corresponding to an entered keystroke. This provides direct visual feedback to a user for a character or characters entered using a limited user input interface, where such interfaces include a phone keypad, soft keys, or icon based entries.

2. Description of Related Art

The Internet is a rapidly growing communication network of interconnected computers and computer networks around the world. Together, these connected computers form a repository of multimedia information that is readily accessible by the connected computers from anywhere at any time. To navigate a portion of the Internet organized as the "World Wide Web", the connected computers, e.g., workstations and desktop computers, typically rely upon a "browser" used in conjunction with a functional user interface that includes a keyboard with 100-plus keys and a large display screen. These user interface elements enable a user to easily interact with multimedia information found throughout the Internet.

To provide mobility and portability for users of the Internet, interactive two-way communication mobile devices capable of communicating, via wireless data networks, with the Internet have been introduced. The interactive two-way communication mobile devices (e.g., two-way pagers, cellular phones, palm-sized computing devices and personal digital assistants (PDAs)) are among the fastest emerging communication devices. These devices enable users to receive, collect, analyze, review and disseminate information as the users travel or move about. However, the mobile devices are characterized by some limitations, one of which is that the user interface includes a telephone keypad or soft keys along with a relatively small screen.

Typically a phone keypad, as shown in FIG. 1, comprises twelve keys or buttons representing "0 to 9", "*" and "#" keys. To facilitate the input of characters, each numeric key is commonly assigned to represent certain alphabetical characters as follows:

"1" key is assigned for a special use;
"2" key is for "A", "B" or "C"
"3" key is for "D", "E" or "F";
"4" key is for "G", "H" or "I";
"5" key is for "J", "K" or "L";
"6" key is for "M", "N" or "O";
"7" key is for "P", "Q", "R" or "S";
"8" key is for "T", "U" or "V" and;
"9" key is for "W", "X", "Y" or "Z".

The "*" key and "#" key are also assigned for other special uses.

There are several ways to specify a particular character assigned to a numeric key by pressing the numeric key one or more times. For example, a user might press "2" for "A", "22" for "B", "222" for "C", or "7777" for "S", followed by a character-break flag after each character entry. The "#" key entry or a pause may be used as the character-break flag in some applications. Another way to specify a character using the numeric keys is the use of the ticker symbols, namely, two numeric keys for each character. The first key indicates a group of characters in which a desired character is located. The second key identifies the position of the character within the group. For example, a user might press "2" and "1" keys for "A", "2" and "2" for "B", "2" and "3" for "C"or "7" and "4" for "S". In either of these methods, a user must rely on visual feedback from a screen to be confident of what data is entered by the keystroke sequence.

For devices, such as cellular phones or two-way pagers, that have relatively small screens, the visual feedback provided by the small screen provides only a minor benefit and may introduce disadvantages. A user having to stare at the characters being entered and displayed on a small screen for a period of time may suffer from visual exhaustion and subsequent loss of concentration. Thus, there is a need for a method to enable devices with relatively small screens to be able to display entered data in a manner that makes a user more easily aware of that data.

SUMMARY OF THE INVENTION

The present invention has been made in consideration of the above described problems and needs and has particular applications to portable devices with a small screen and a limited input interface. The portable devices, may include, but are not be limited to, mobile computing devices, cellular phones, palm-sized computer devices, personal digital assistant devices and remote controllers.

According to one aspect of the present invention, an inventive display method is employed to provide users with greater visual feedback after entry of data, so that a user will more readily know what data is entered. When a user activates a key or inputs a sequence of keystrokes, a corresponding data character or characters is determined and displayed in a highlighting window. The desired character or set of characters may be determined by a predictive data entry method (in which a keystroke or keystrokes are mapped to possible corresponding characters, or a predictive method is used to complete a set of characters after entry of one or more initial characters). The highlighting window provides greater visual feedback to the user through magnification, reverse video, or some other contrast enhancement method. If the user scrolls to a new character or characters because the currently displayed one(s) are not desired, then the new character or characters are displayed in the highlighting window. When the user ceases scrolling, indicating that the currently displayed character or characters are what the user desires, the highlighting window disappears and the display of the selected character or characters is restored to be the same format as previously entered characters.

The entered element may be a character or a sequence of characters and may be produced from a lookup process (e.g., a predictive data entry method) or by a phone keypad entry method, such as described previously. With the disclosed method, the desired character or characters can be efficiently determined and verified before acceptance as entered data. The present invention can thus be advantageously used in portable mobile devices having small screens and limited data entry interfaces.

According to one embodiment, the present invention is a method for providing visual feedback to a user when a key is activated or selected, where the method comprises: receiving an entry entered by said user on a user interface; determining a possible or desired character or characters corresponding to said entry; and highlighting the character or characters to display them in a manner that emphasizes the character or characters to the user. The method further comprises accepting the proposed character or characters as data to be entered when no change is made to the proposed character or characters, and restoring the highlighted element(s) to the manner in which other previously entered characters are displayed.

According to another embodiment, the present invention is directed to an apparatus for providing visual feedback to a user when a character is being entered, and comprises: a display screen; a screen driver coupled to and controlling the screen to generate a display; an input interface; a memory for storing code for an application module; a processor coupled to the screen driver, the input interface and the memory, to execute the code in the memory to cause the application module to drive the screen driver and cause the screen to display a string of characters in a first manner, wherein the characters are entered by the user on the user interface; display a new character corresponding to an entry by the user on the user interface, wherein the new character is displayed on the display screen in a second manner that emphasizes the new character relative to previously entered character(s); and restoring the new character to the first display mannner after a predefined time.

Accordingly, one of the objects in the present invention is to provide a solution to the problem of needing a method and apparatus for displaying an element being entered or character corresponding to that element in a manner that permits a user to more clearly see what is being entered when using a relatively small screen.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF THIS INVENTION

Notation and Nomenclature

Figure 1:
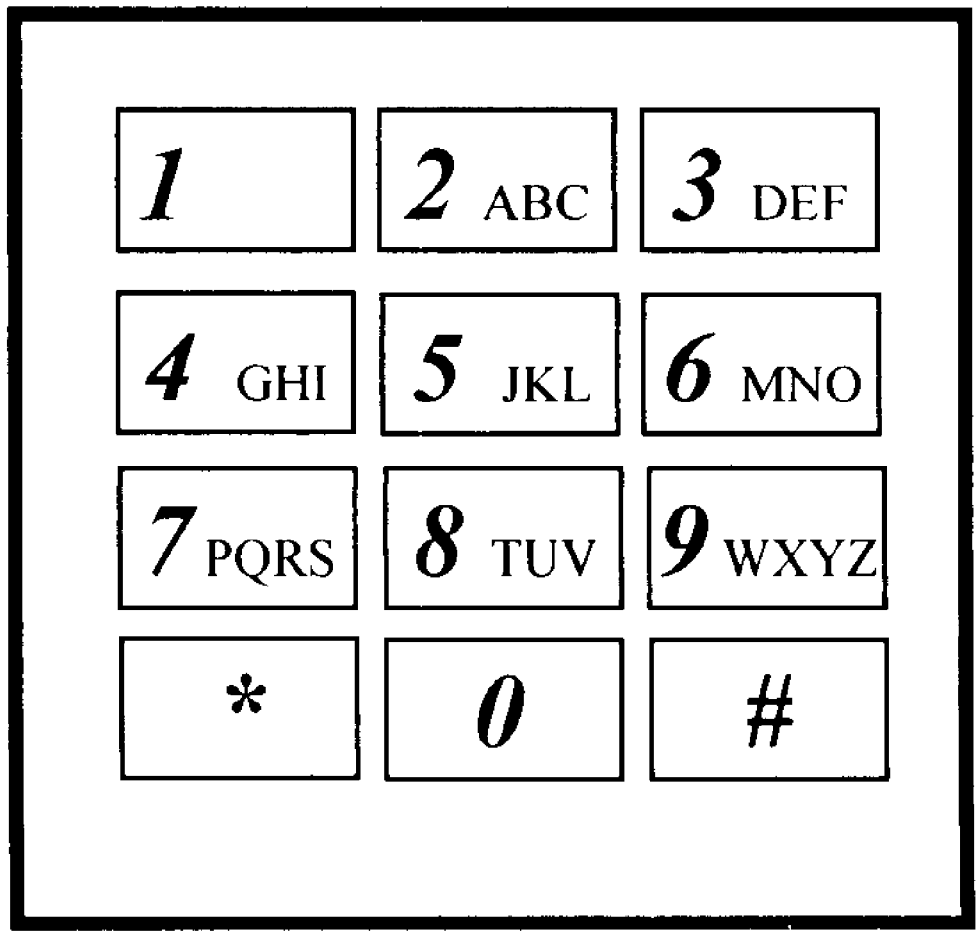
FIG. 1 illustrates a phone keypad commonly used in telephone devices.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following is presented largely in terms of procedures, steps, logic blocks, processing, and other symbolic representations that resemble of data processing devices including two-way communication interactive devices such as mobile phones, two-way pages, telephones and remote controller. These process descriptions and representations are the means used by those experienced or skilled in the art to most effectively convey the substance of their work to others skilled in the art. The method along with the apparatus to implement the method to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

When entering and viewing textual information, prior art solutions for displaying an entry enable a user to verify and alter the textual information to produce the desired character, but can cause eyestrain and exhaustion when used with a device having a relatively small screen. The present invention includes the highlighted display of the textual information (e.g., a character or characters) corresponding to the data being entered and provides a more efficient way of viewing a desired character or sequence of characters. The invention is of particular utility when used in systems with a small display device and a limited data entry means. For example, the present invention can be advantageously used on portable mobile devices with relatively small screens.

Figure 2A:
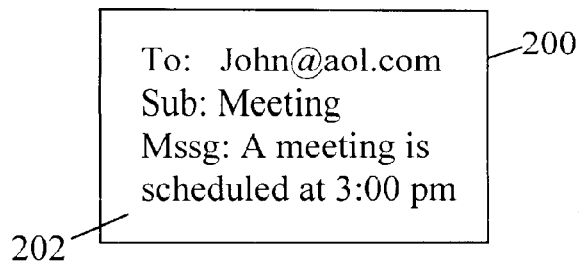
FIGS. 2A to 2E illustrate, respectively, a sequence of screen displays useful in describing the operation of the present invention.

FIGS. 2A to 2E illustrate, respectively, a sequence of screen displays useful in describing the operation of the present invention. FIG. 2A depicts a relatively small screen 200, of the type typically available in a mobile device. Examples of such mobile devices include a cellular phone, a two-way pager, a remote controller, and a personal data assistant, and include a screen and a data entry interface. The data entry interface may be a phone keypad having a limited number of numeric keys (and a corresponding assignment of letters to those keys), and may include displayed soft keys or icons for activation by a user action. In the following, unless otherwise specifically described, data entry keys or buttons are generally referred to as either physical keys or soft keys. As noted, each of the keys, like a key in the phone keypad, may be associated with multiple possible meanings. Screen 200 is typically a LCD display device capable of displaying textual information and limited graphics. To facilitate the description of the invention, FIG. 2A shows that an email message 202 is being composed by a user with a phone keypad.

Figure 2B:
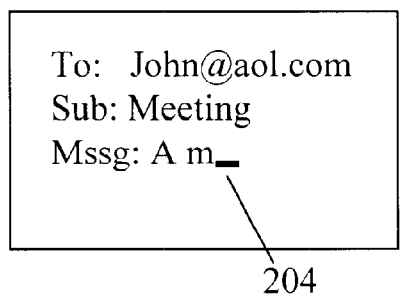

In accordance with one aspect of the present invention, FIG. 2B shows screen 200 during the process of composing the message, specifially, after a user has finished entering the intended recipient's address information (John@aol.com) and the message's subject information (meeting). As shown in the figure, a cursor 204 indicates the location in the message where the next character is to be entered. With reference to FIG. 2A, the user desires to enter the letter or character "e" in the word "meeting". If the user presses the "3" key on the keypad, then depending upon the process used for determining the desired character based on the entered keystroke, the character "D" may be displayed prior to any additional keystrokes or data entry by the user.

Figure 2C:
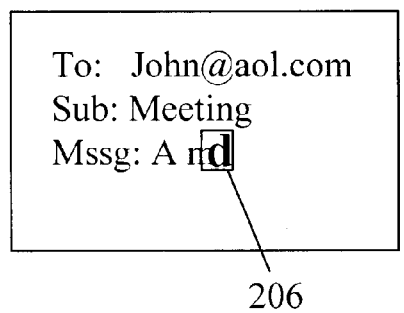

Referring now to FIG. 2C, there is shown a highlighting window 206 that displays and emphasizes the character corresponding to the entered keystroke(s). This process of "emphasizing" the character may be accomplished in a variety of ways and is designed to provide an enhanced visual contrast between the newly determined character or characters and those determined from earlier key entries. One of the benefits of the present invention is that it provides a comparatively clearer form of visual feedback to the user that identifies the entered keystroke, the character(s) corresponding to that keystroke, or both.

In the example shown, the character "D" is highlighted in highlighting window 206. This is accomplished in a manner (enlargement, shadowing, presentation in a contrasting manner relative to the other text, etc.) that provides the user with an easier and more effective way of perceiving the data. If the user determines that the resultant character from the key entry or sequence of key entries is not what is desired, another key may be activated to correct the entry in a manner dependent upon the key entry to corresponding character determining method implemented in the device.

Figure 2D:
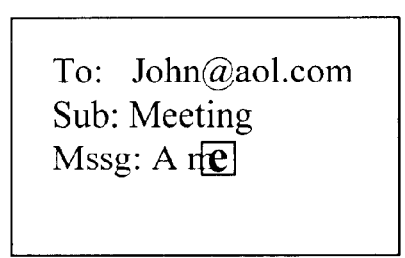
Figure 2E:
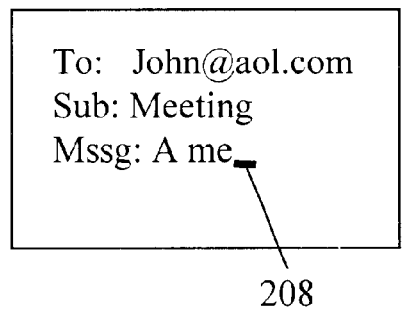

For example, using one of the methods for relating a key entry to the corresponding character(s) described previously, a repeated activation of the same "3" key may result in the character "e", being displayed, as shown in FIG. 2D. After a predefined time, for example, 0.5 second, and as shown in FIG. 2E, the character "e" is accepted as the character corresponding to the entered keystroke(s) and highlighting window 206 and the associated manner of visual enhancement is discontinued. The accepted character(s) is then displayed in the position indicated originally by cursor 204 in the same manner as the previously entered characters. A new cursor position 208 (as shown in FIG. 2E) is then displayed in anticipation of a subsequent keystroke and the associated character(s).

Note that in the example shown, the action of highlighting window 206 is visually indicated to the user by enlarging the character therein. However, other highlighting methods, including, but not limited to inverse image or video, a different font, or the position of the element being at a specific position of the display, could also be used to implement the functionality of highlighting window 206. Another possible feature of the highlighting window is that its size may be varied relative to the previously entered characters. Note that the example shows the, highlighting window being used to highlight a character. Those skilled in the art will appreciate that the highlighting window may also be used to highlight an element that can be a sequence of characters or other graphic characters.

Figure 3A:
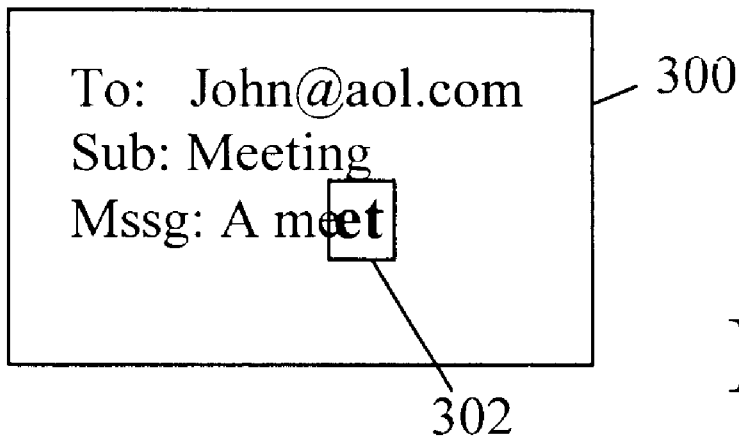
FIGS. 3A to 3C illustrate, respectively, a sequence of screen displays resulting from a lookup process that may be used in implementing the present invention.
Figure 3B:
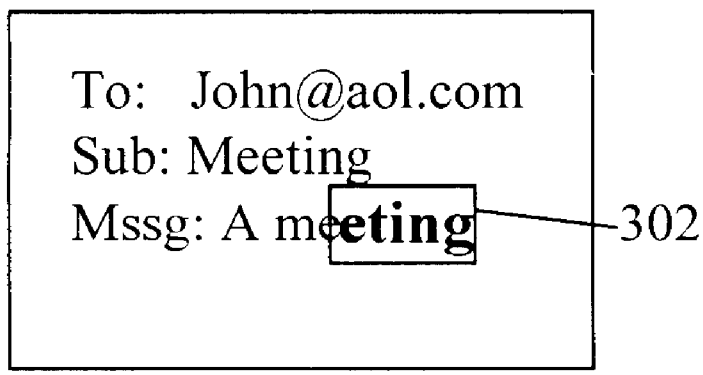
Figure 3C:
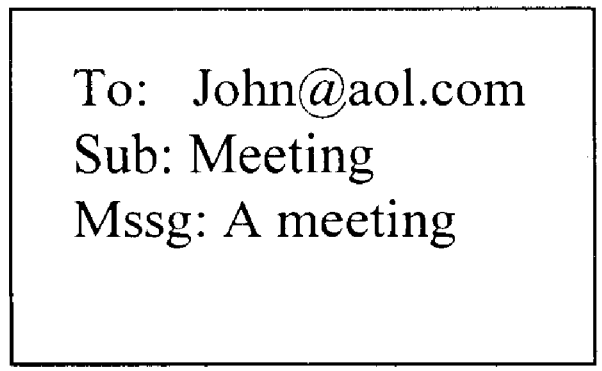

FIGS. 3A through 3C illustrate, respectively, a sequence of screen displays resulting from a lookup process that may be used in implementing the present invention. FIG. 3A demonstrates an embodiment of the present invention in which more than one character is presented by an operation performed by the mobile device in response to entry of a keystroke or keystrokes by a user, with the presented characters being highlighted in window 302 on screen 300. An example of such an operation would a predictive data entry method, where such a method returns a group of characters that may be used to complete a commonly used word based on previously entered characters. With reference to FIG. 2E, in such a method, a user activates the "3" key on the phone keypad with the intent of entering another "e".However, in accordance with the use of predictive data entry method, instead having a single character "e" presented for display, the device presents the 2 characters "et" in the highlighting window 302. This combination of characters is the result of the predictive data entry method determining the most likely characters used to complete a known word or the most commonly used characters that follow the previously entered characters "me". A more detailed description of a predictive data entry method that may be used is provided in U.S. Pat. No. 5,911,485, issued Jun. 15, 1999, assigned to the assignee of the present invention, and the contents of which is hereby incorporated by reference.

If the user determines that the characters shown in highlight window 302 are not the desired ones, then the user may press the "3" key again, or any other designated key, to scroll through other possible character(s) that the predictive data entry method may produce. As shown in FIG. 3B, another possible set of characters that the predictive data entry method may return is "eting", to complete the word "meeting". After a predefined time, highlighting window 302 automatically disappears and the display format of the presented characters (e.g., "eting") is restored to the normal display format (i.e., that of the previously entered characters). This completes the acceptance of the new characters "eting" as the entry, as shown in FIG. 3C.

Figure 4:
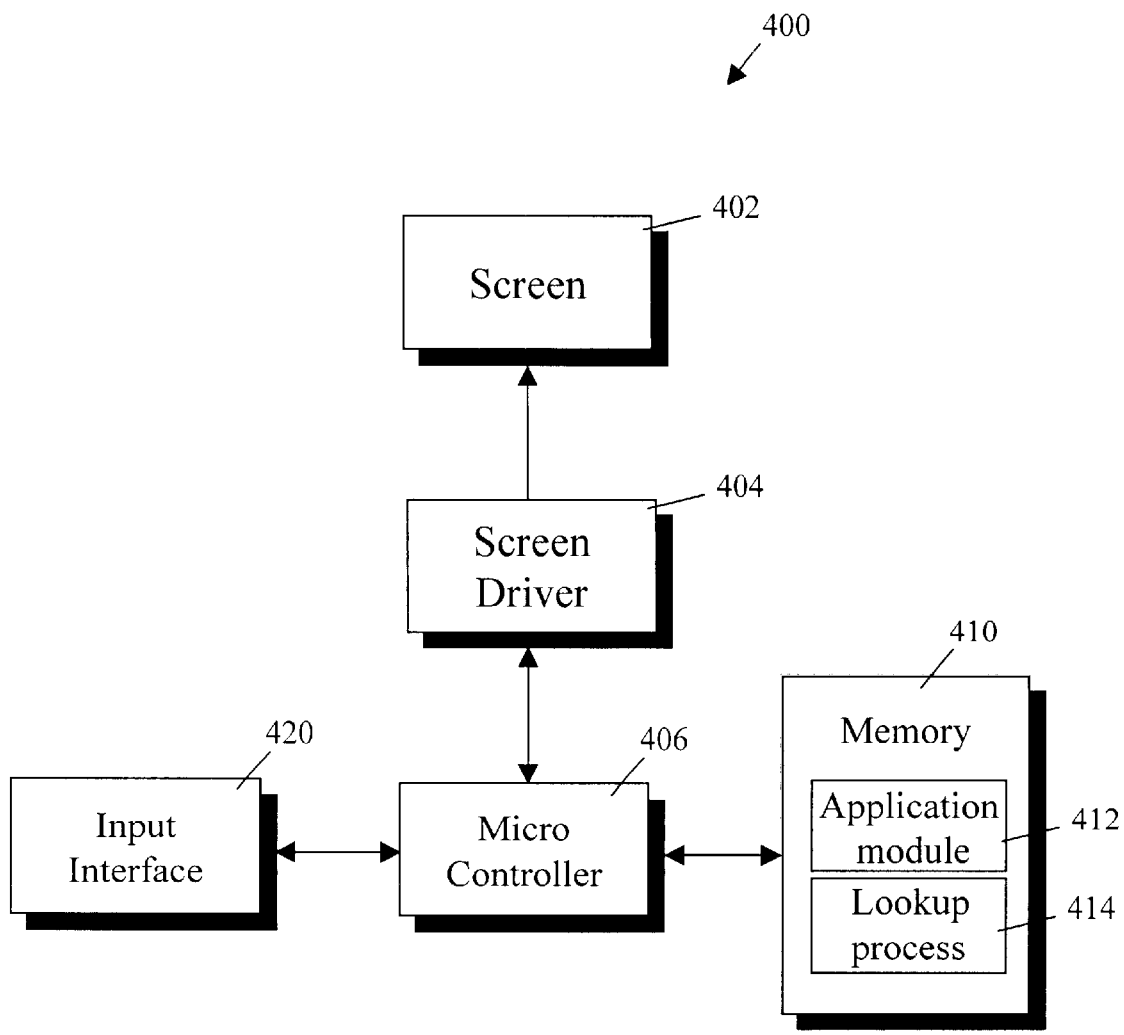
FIG. 4 shows an internal functional block diagram of a portable device in which the present invention may be practiced.

FIG. 4 illustrates an internal functional block diagram of a portable mobile device 400 in which the present invention may be implemented. Portable device 400 may include, but is not limited to, a cellular phone, a two-way pager, a palm-sized computing device, a remote controller, or a personal digital assistant, and has a screen 402 that may be a LCD screen. The data displayed on screen 402 is controlled by a screen driver 404 that is in turn controlled by a micro-controller (processor) 406. Memory 410 includes a compiled and linked version of one implementation of the present invention as an application module 412.

When micro-controller 406 executes application module 412, screen driver 404 is caused to generate control signals to drive screen 402 to display elements in accordance with application module 412.

According to one implementation, a lookup or predictive data entry process 414 is loaded in memory 410. Lookup process 414 acts to determine what character or characters are the most likely desired ones with respect to any previously entered characters. One possible implementation of a lookup process 414 is the use of a character frequency table, as detailed in the previously mentioned U.S. Pat. No. 5,911,485.

When device 400 is powered on, both application module 412 and lookup process 416 are executed on microcontroller 406. Input interface 420 coupled to and controlled by micro-controller 406 receives user inputs from a keypad or other input mechanism. Note that lookup process 414 does not have to be physically located in the mobile device, and may instead be located in a remote proxy server. The display screens in FIGS. 2A to 2E and FIGS. 3A to 3C are examples that may be caused to be displayed by screen driver 404, in response to instructions from application module 412 and execution of lookup process 414.

As described above, input interface 420 may be a phone keypad. As noted, a regular phone keypad is not the only input interface that may be used to practice the present invention. In this regard, some portable devices may have no physical keys at all, such as hand-held computing devices that use soft keys or icons as an input means for users to interact with the devices.

Figure 5:
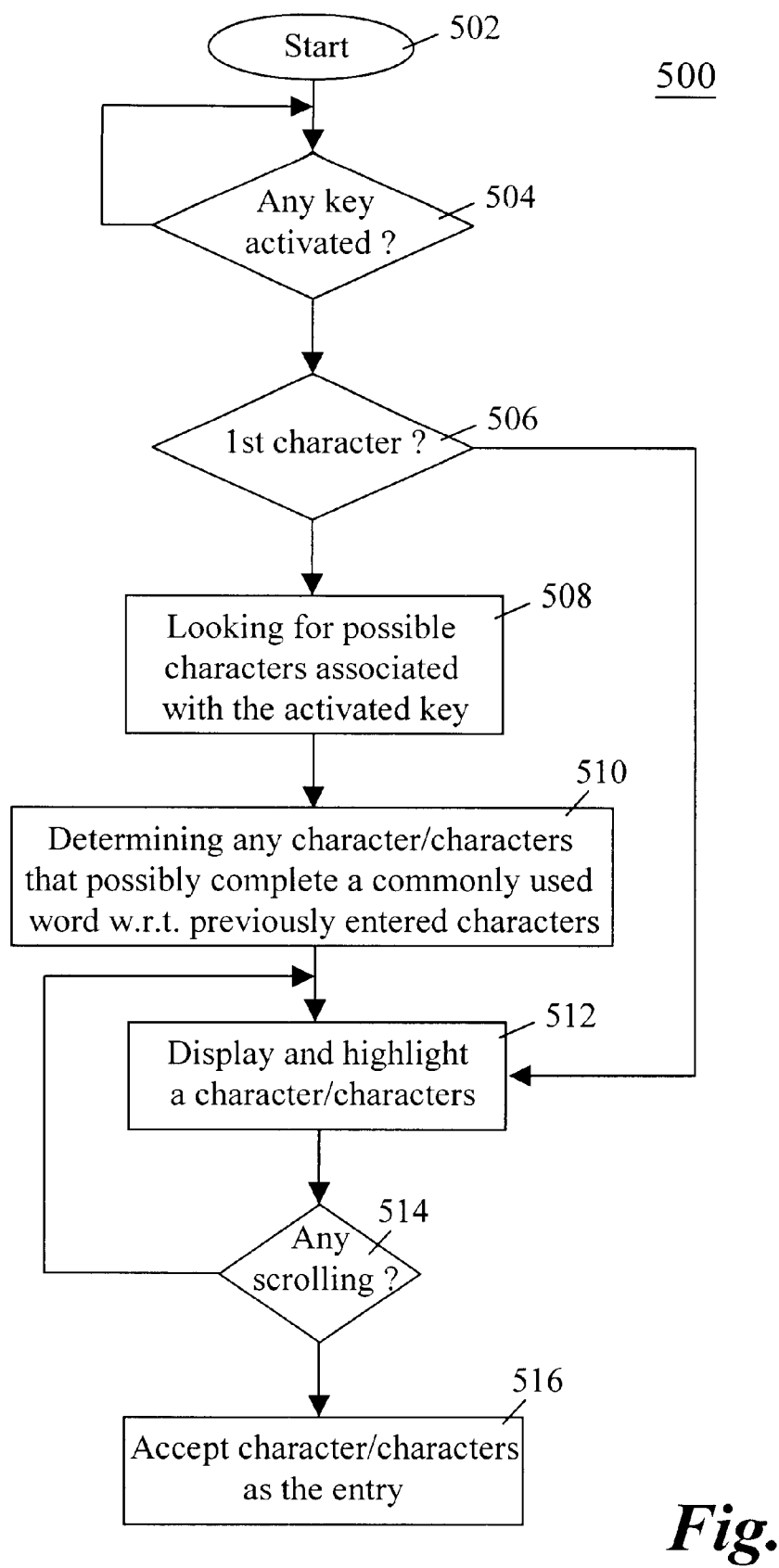
FIG. 5 illustrates a process flowchart according to one embodiment of the present invention.

FIG. 5 illustrates a process flowchart 500 according to one embodiment of the present invention and should be understood in conjunction with the preceding figures. At 502, a portable device is powered on and/or placed into a mode ready for inputs from a user. In this mode, the device may be scanning the user interface to determine if any keys are activated at 504. After a key activation is detected, then it is necessary to determine if the activated key corresponds to the first character of a word. If it is a first character of a word, the character is displayed and highlighted at 512. Referring to FIG. 2A, when the user starts with the word "meeting" and presses the "6" key for the character "m", that character is displayed and highlighted. In the case that the character "m" is not what is intended, a second press of the "6" key will bring up the letter "n" (this corresponds to the scrolling operation at 514).

Returning to 506, if it is determined that the activated key does not correspond to the first character of a word, a processor controlling the process shown in flowchart 500 in the device initiates a lookup or predictive data entry process. Such a process may return one or more characters that are used to complete commonly used words based on previously entered characters. As noted, given a first character, there may be numerous commonly used words associated with the first character. If this is the case, a second character is sometimes entered in a similar manner to the first one. With the previously entered two characters, a third activated key may be used to call the predictive data entry process to produce one or more possible words.

At 510, the lookup process searches for all possible commonly used words/phrases depending on the type and operations of the lookup process implemented, and return those character(s) that complete commonly used words/phrases. At 512, the returned character(s) are displayed and highlighted. As shown in FIGS. 3A to 3C, characters "et" are first returned for possible word "meet". If the user decides that the returned word is not what is intended, the user may press the key again to scroll to the next possible word in a list composed by the lookup process at 514. Thus the characters "eting" are returned after "me" to complete the word "meeting". If the second group of characters is what the user desires, then these characters may be accepted as data entries and placed in a memory of the device.

There are many advantages and benefits of the present invention that can be appreciated by those skilled in the art. For example, in conventional methods, newly entered character(s) may be difficult to visualize among other displayed words/characters. In contrast, the current invention provides a highlighting window that provides a higher contrast display of the character(s) corresponding to the entered keystrokes. Consequently, a user of a portable device with a small screen and a limited input interface can edit messages or interact with a data network more quickly and efficiently.

It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. A method for displaying a character or characters corresponding to an activated element of a user interface, comprising:

receiving an activated element of the user interface;

determining a character or characters corresponding to the activated element; and displaying the determined character or characters in a highlighting window, thereby causing each of said characters to be displayed in a contrasting format from previously entered data that is displayed, the contrasting format at least comprising an enlargement of the character or characters.

2. The method of claim 1, wherein the contrasting format additionally comprises reverse video.

3. The method of claim 1, wherein the contrasting format additionally comprises a different font.

4. The method of claim 1, wherein said determining a character or characters further comprises:

determining a character or characters using a lookup process, the process having previously entered data as an input.

5. The method of claim 1, further comprising:

accepting said character or characters as entered data after a predetermined period of time.

6. The method of claim 5, wherein said accepting said character or characters further comprises:

detecting if there is an activation of an element of the user interface; and restoring each of said characters displayed in the highlighting window to the format which previously entered characters are displayed.

7. The method of claim 1, wherein said user interface is a keypad of a mobile device.

8. The method of claim 7, wherein said mobile device is a telephone.

9. The method of claim 1, wherein said activated element is a key activated by a user.

10. The method of claim 9, wherein the key represents a group of characters.

11. The method of claim 10, wherein said determining a character or characters further comprises presenting each of said characters to a user individually and successively.

12. A method of assisting a user to enter data using a user interface having elements that may be activated by the user, comprising:

displaying a string of characters on a display screen in a first format, wherein the characters correspond to an activated element or element of the user interface;

receiving a newly activated element of the user interface;

displaying a character or characters corresponding to the newly activated element on said display screen in a second format, said second format comprising at least an enlargement of the character or characters corresponding to the newly activated element compared to the first format, wherein said second format contrasts with the first; and restoring said second format to said first format after a predefined time.

13. The method of claim 12, wherein the second format additionally comprises a different font from the first format.

14. The method of claim 12, wherein said user interface further comprises a soft key displayed on said display screen.

15. The method of claim 12, wherein said user interface is a keypad of a mobile device.

16. The method of claim 15, wherein the mobile device is a telephone.

17. An apparatus for displaying a character or characters corresponding to an activated element of an input interface, comprising:

a display screen;

an input interface;

a screen driver operable to cause said display screen to displays-a character or characters corresponding to an activated element of the input interface;

a memory for storing instructions for an application module; and a processor coupled to said screen driver, said input interface, and said memory, said processor executing said instructions to cause said screen driver to drive said display screen to display a string of characters corresponding to an activated element of the input interface on the display in a first format;

receive a newly activated element of the input interface;

display a character or characters corresponding to said newly activated element on said display screen in a second format, said second format comprising at least an enlargement compared to the first format, wherein said second format contrasts with said first format; and restore said second format to said first format after a predefined time.

18. The apparatus of claim 17, wherein said apparatus is selected from a group consisting of a telephone, a two-pager, a hand-held computing device, and a digital data assistant (PDA).

19. The apparatus of claim 17, wherein said input interface is a keypad of a mobile device.

20. The apparatus of claim 17, wherein said input interface further comprises a soft key displayed on said display screen.

* * * * *